(12) United States Patent
Osmon et al.

(10) Patent No.: US 9,916,737 B2
(45) Date of Patent: Mar. 13, 2018

(54) MODULARIZABLE REGISTER

(71) Applicant: Wal-Mart Stores, Inc., Bentonville, AR (US)

(72) Inventors: Joshua David Osmon, Bentonville, AR (US); Tricia Mcpherson Hicks, Bentonville, AR (US); Lori Lee Wise, Rogers, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 15/258,482

(22) Filed: Sep. 7, 2016

(65) Prior Publication Data

US 2017/0076559 A1 Mar. 16, 2017

Related U.S. Application Data

(60) Provisional application No. 62/217,418, filed on Sep. 11, 2015.

(51) Int. Cl.
*G07G 1/00* (2006.01)
*H04N 7/10* (2006.01)
*H04N 7/18* (2006.01)

(52) U.S. Cl.
CPC ............ *G07G 1/0027* (2013.01); *H04N 7/10* (2013.01); *H04N 7/183* (2013.01)

(58) Field of Classification Search
CPC ......... G07G 1/2027; H04N 7/10; H04N 7/183
USPC .................................................. 235/7 R, 379
See application file for complete search history.

(56) References Cited

U.S. PATENT DOCUMENTS

| 5,608,609 | A | 3/1997 | Morrell |
| 7,486,505 | B2 | 2/2009 | Fushimi et al. |
| 8,582,292 | B1 | 11/2013 | Eichelberg |
| 8,678,286 | B2 * | 3/2014 | Smith ............... G06K 7/10554 235/462.12 |
| 2006/0258206 | A1 | 11/2006 | Lam |

(Continued)

FOREIGN PATENT DOCUMENTS

| CA | 2510870 A1 | 12/2005 |
| CN | 2867799 Y | 2/2007 |

(Continued)

OTHER PUBLICATIONS

Search Report Issued in related Great Britain patent application GB1614780.3 dated Feb. 3, 2017.

(Continued)

*Primary Examiner* — Karl D Frech
(74) *Attorney, Agent, or Firm* — McCarter & English, LLP; David R. Burns

(57) ABSTRACT

Exemplary embodiments are directed to a method, system and assembly for storing components of a point-of-sale (POS) station while keeping the electronic components live and updated. All non-electronic and electronic components of a POS station are disassembled. The non-electronic components except for a cash box with an open face are removed from the sales floor. The electronic components are stored within the inner cavity of the cash box. The open face of the cash box is securely covered using a shroud. The electronic components are kept live and updated using an network and electricity pole resting in a hollow opening of the cash box.

20 Claims, 10 Drawing Sheets

(56) References Cited

U.S. PATENT DOCUMENTS

| | | | |
|---|---|---|---|
| 2007/0247037 A1 | 10/2007 | Schenker | |
| 2009/0310291 A1 | 12/2009 | Willburn et al. | |
| 2011/0261203 A1* | 10/2011 | Mupkala | H04N 7/18 348/150 |
| 2013/0228104 A1 | 9/2013 | Susaki et al. | |
| 2014/0201013 A1 | 7/2014 | Dsouza | |

FOREIGN PATENT DOCUMENTS

| | | |
|---|---|---|
| CN | 103064468 A | 4/2013 |
| CN | 203070438 U | 7/2013 |
| CN | 204393833 U | 6/2015 |
| EP | 1372097 A1 | 12/2003 |
| EP | 2645343 A2 | 10/2013 |
| EP | 2690942 A2 | 1/2014 |

OTHER PUBLICATIONS (Mozart), May 16, 2014, "Walmart Store Cash Registers", Flckr at hhttps://flickr.com/photos/ieepersmedia/14248336115, accessed Mar. 7, 2017.

\* cited by examiner

MODULARIZABLE REGISTER

CROSS-REFERENCE TO RELATED PATENT APPLICATIONS

This application is claims priority to U.S. Provisional Application No. 62/217,418 filed on Sep. 11, 2015, the content of each application is hereby incorporated by reference in its entirety.

BACKGROUND

Larger retail stores often include a number of point-of-sale stations to accommodate a large number of customers during peak shopping seasons. However, during off-peak shopping season many of these point-of-sale stations remain unused and take up space in the store.

SUMMARY

Exemplary embodiments present a point-of-sale (POS) assembly including a POS controller, one or more peripheral electronic components in communication with the POS controller, non-electronic components and an electrical conduit. In exemplary embodiments, the non-electronic components include a cashbox, the cashbox is secured to a sales floor of a store. In exemplary embodiments, the cash box has opposing side walls, a back wall, and a top wall defining an interior cavity accessible via an open front face of the cashbox. In exemplary embodiments, the electrical conduit extends from the sales floor or a ceiling of the store to provide electricity and network connectivity to the POS controller and the one or more peripheral electronic components via the cashbox. In exemplary embodiments, in an assembled state, the non-electronic components are disposed on the sales floor and the one or more peripheral devices are disposed external to the interior cavity of the cashbox to form a checkout area to facilitate one or more financial transactions. In exemplary embodiments in a disassembled state, the cashbox remains on the sales floor while the remainder of the non-electronic components are removed from the sales floor and the POS controller and the one or more electronic components are stored in the cashbox. In exemplary embodiments, the front open face of which being covered by a shroud secured to the cashbox to prevent removal of the POS controller and the one or more electronic components. In exemplary embodiments, the POS controller and the one or more peripheral electronic components stored in the cashbox receiving electricity and network connectivity via the electrical conduit to keep the POS controller and the one or more peripheral electronic components stored in the interior cavity of the cashbox connected to electricity and to a network.

Exemplary embodiments present a method for storing electronic components of a point of sale (POS) assembly using a component of the POS assembly including disassembling a POS assembly. In exemplary embodiments, a POS assembly includes of a POS controller, one or more peripheral electronic components in communication with the POS controller, and non-electronic components, the non-electronic components including a cashbox secured to a sales floor and having opposing side walls, a back wall, and a top wall defining an interior cavity accessible via an open front face of the cashbox. In exemplary embodiments, at least some of the non-electronic components, the cash box remaining on and secured to the sales floor are removed from the sales floor. In exemplary embodiments, the POS controller and the one or more peripheral electronic components in communication with the POS controller are stored in the interior cavity of the cash box. In exemplary embodiments, a shroud is secured to the open face of the cash box to prevent removal of the POS controller and the one or more electronic components from the cash box. In exemplary embodiments, electricity and network connectivity is provided, via an electrical conduit extending from the sales floor or a ceiling of the store, to the POS controller and the one or more peripheral electronic components stored in the interior cavity of the cashbox.

Exemplary embodiments present a system for storing electronic components of a point of sale (POS) assembly using a component of the POS assembly. In exemplary embodiments, the system includes a cashbox of the POS assembly secured to a sales floor of a store, an electrical conduit extending from the sales floor or a ceiling of the store, and a shroud. In exemplary embodiments, the cash box has opposing side walls, a back wall, and a top wall defining an interior cavity accessible via an open front face of the cashbox. In exemplary embodiments, the electrical conduit provides electricity and network connectivity to the interior cavity of the cashbox. In exemplary embodiments, the shroud is configured to be selectively secured to the cashbox to cover the front open face of the cashbox and obstruct access to the interior cavity of the cashbox. In exemplary embodiments, the electronic components of the POS assembly are stored within the interior cavity of the cashbox when the POS assembly is disassembled and the shroud is secured to the cash box to enclose the electronic components of the POS assembly within the cashbox when the POS assembly is disassembled and prevent removal of the electronic components from the cash box. In exemplary embodiments, the electronic components enclosed in the cashbox receiving electricity and network connectivity via an electrical conduit extending from the sales floor or a ceiling of the store to keep the electronic components of the POS assembly enclosed in the interior cavity of the cashbox connected to electricity and to a network.

BRIEF DESCRIPTION OF DRAWINGS

Some embodiments are illustrated by way of example in the accompanying drawings and should not be considered as a limitation of the invention.

DESCRIPTION OF EXEMPLARY EMBODIMENTS

Described in detail herein are methods, assemblies, and systems associated with point-of-sale stations on a sales floor in a physical retail environment, and more particularly, to methods, assemblies, and systems for configuring the point-of-sale station in an assembled/operable state for processing transactions and a disassembled/inoperable state for storing point-of-sale ("POS") station components. In exemplary embodiments, electronic POS terminal components of the point-of-sale terminal can be stored on the sales floor when the point-of-sale stations in disassembled states, and power and network connectivity to the electronic terminal equipment can be maintained. In example embodiments, the POS terminal components and non-electronic components of the POS station are disassembled. The non-electronic POS components, except for the cash box, can be removed from the sales floor. The POS terminal components can be stored in a cavity of the cash box. A shroud can be secured to the cash box to secure the POS terminal components within the cash box. The POS terminal components stored in the cash box can remain connected to a communication network and electricity.

The following description is presented to enable any person skilled in the art to create and use systems, assemblies and related methods associated with POS stations to configure the POS stations in assembled and disassembled states where POS terminal components maintain network and electric conductivity to the POS terminal components in the assembled and disassembled states. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that example embodiments of the present disclosure may be practiced without the use of these specific details. In other instances, well-known structures and processes are shown in block diagram form in order not to obscure the description of example embodiments with unnecessary detail. Thus, the present disclosure is not intended to be limited to the embodiments shown, but is to be accorded the widest scope consistent with the principles and features disclosed herein.

Figure 1:
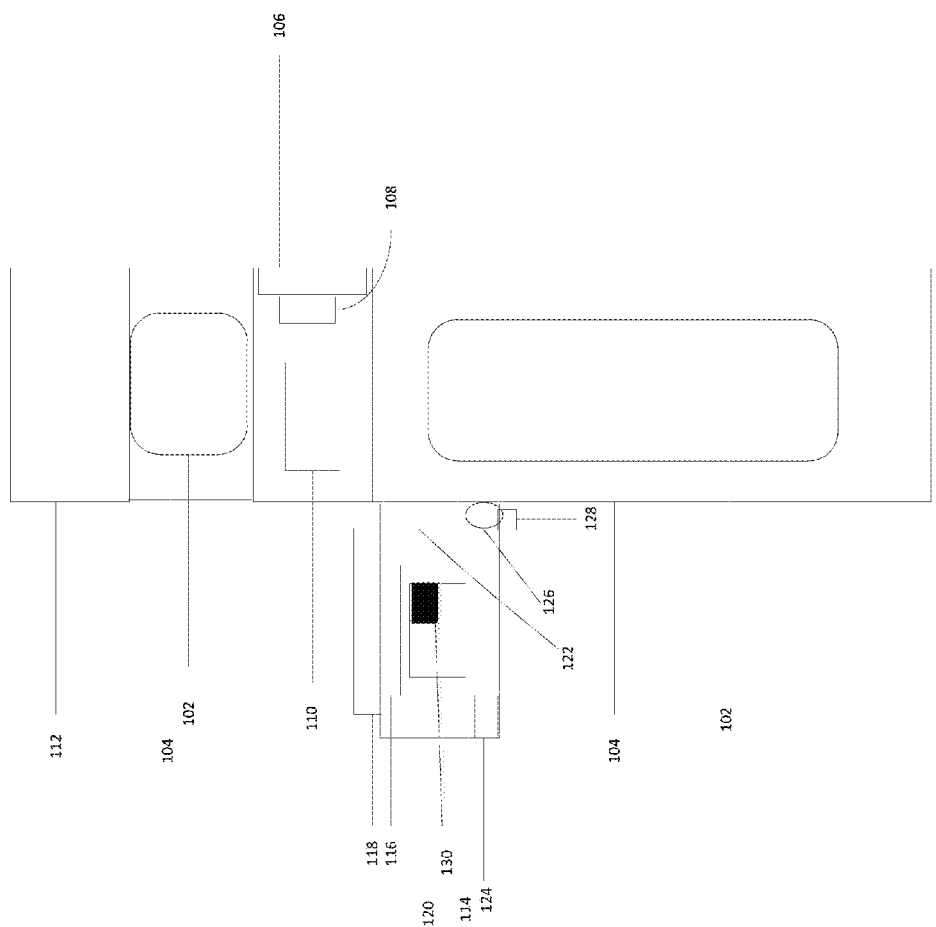
FIG. 1 is a block diagram showing a point-of-sale station including example point-of-sale components, according to example embodiments.
Figure 2:
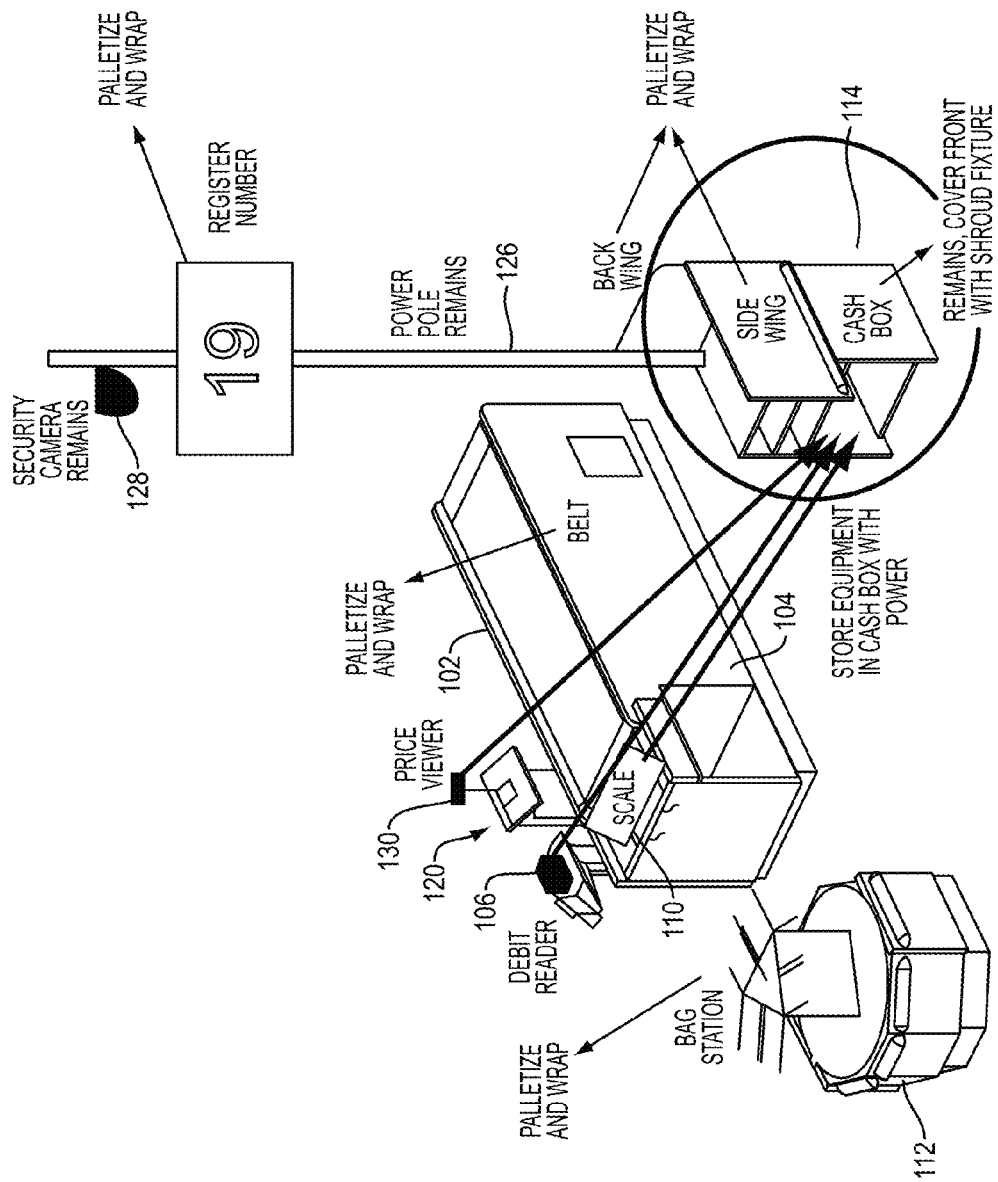
FIG. 2 illustrates example of point-of-sale station at least partially disassembled according to example embodiments.

FIGS. 1 and 2 illustrate a POS station 100 that includes POS components disposed on a sales floor of a physical retail store. FIG. 1 is a block diagram showing a plan view of the POS station 100 in an assembled state or form, according to an example embodiment. In the assembled state, the POS station 100 can be used by a cashier (or customers for self-service POS stations) to process transactions for customers. FIG. 2 is a perspective side view of the POS station 100 in a partially disassembled state or form, according to an example embodiment. In the disassembled state, the POS station is incapable of performing customer transaction (at least because some of the components of the POS station are removed or inaccessible in the stored disassembled state). At least some electronic terminal components of the POS station can be stored and secured in a non-electronic component of the POS station when the POS station is in its disassembled state. In the example shown in FIGS. 1 and 2, the POS station 100 includes belts 102, belt cabinets 104, a card reader 106, an optical scanner 108, a scale 110, a bagging station 112, a cash box 114, a keyboard 116, a cash drawer 118, a display 120, scan gun 122, receipt printer 124, a POS controller (e.g., shown in FIG. 3) disposed within the cash box 114, network and electricity conductivity pole 126, a security camera 128, and a customer display 130.

The belts 102 may be conveyor/endless belts disposed in the belt cabinets 104, which may also include rollers (e.g., friction and drive rollers) and a drive motor. The driver motor can control one or more of the rollers to rotate the belt to provide a transport for moving items from one end of the belt cabinet 104 to an opposite end of the belt cabinet 104. For example, one of the belts 102 can be driven to move items placed on the belt towards the optical scanner 108 and another one of the belts can be driven to move the item away from the optical scanner 108. The belt cabinets 104 can have a rectangular structure having side and bottom walls. Respective ones of the belts 102 can extend along a top portion of each of the belt cabinets 104. In addition, POS terminal components can be disposed on or in one or more of the belt cabinets 104. For example, in example embodiments, at least one of the belt cabinets 104 can support the card reader 106, the optical scanner 108, the scale 110, customer display 130, as well as any other suitable POS terminal components. The POS terminal components can be removably disposed on/in the belt cabinet 104. For example, when the POS station is disassembled, the card reader 106, the optical scanner 108, the scale 110, the customer display 130, as well as any other suitable POS terminal components, can be removed from the belt cabinet(s) 104, the belt cabinet 104(s) can be removed from the sales floor, and the POS terminal components can be stored in the cash box, as described herein.

The card reader 106 may be a magnetic card reader configured to read encoded information from magnetic stripes of payment cards. The magnetic reader may decode the encoded information and transmit the decoded information to the POS controller, or may in the alternative, transmit the encoded information to the POS controller, which may decode the encoded information. A customer or cashier may use the card reader to input tender information into the POS terminal to complete a purchase of one or more items by the customer. In example, embodiments, the card reader can include one or more microcontrollers and can execute reader firmware to implement one or more functions carried out by the card reader 106. The reader firmware can be updated from time-to-time to update an operation of the card reader 106. While an example embodiment has been illustrated as including a magnetic card reader, those skilled in the art will recognize that other types of readers can be utilized instead of, or in addition to, the magnetic card reader. For example, in example embodiments, the car reader can include near field communication (NFC) or Radio Frequency Identification (RFID) reader capability to wireless interact with a customer's payment type.

The optical scanner 108 may be a barcode scanning machine configured to read optical machine-readable representations. The optical scanner 108 can be configured to scan encoded information from machine-readable representations. The optical scanner 108 may decode the encoded information and transmit the decoded information to the POS controller, or may in the alternative, transmit the encoded information to the POS controller, which may decode the encoded information. A customer or cashier may use the optical scanner 108 to input item and/or loyalty/reward information into the POS terminal for use when processing a transaction for the customer. For example, the optical scanner 108 can be configured to scan barcodes or QR codes associated with items to be purchased by a customer and/or can scan customer loyalty/rewards cards/tags. In example embodiments, the optical scanner 108 can include one or more microcontrollers and can execute scanner firmware to implement one or more functions carried out by the optical scanner 108. The scanner firmware can be updated from time-to-time to update an operation of the optical scanner 108.

The scale 110 can be an electronic weighing machine configured to determine a weight of an object placed on the scale. In some embodiments, the scale can be an analog or digital scale that calculates the weight of objects using one or more strain gauges or other suitable devices that can convert a force applied to the scale by an object (e.g., from gravity) to an electrical signal. For example, the scale 110 can be used at the point-of-sale station to weigh an item to be purchased, where the price of an item depends on the weight of the item. A customer or cashier may use the scale 110 to input a weight of an item into the POS terminal to determine a price of the item. In example, embodiments, the scale 110 can include one or more microcontrollers and can execute weighing firmware to implement one or more functions carried out by the scale 110. The weighing firmware can be updated from time-to-time to update an operation of the optical scanner 108. In addition, or in the alternative, the scale 110 may be calibrated, where such calibration can be controlled by the POS controller or by other device remote to the scale (e.g., a server operable coupled to the scale via a communication network).

The bagging station 112 disposed at the end of the POS station. The bagging station provides a structure for storing bags and an area that allows customers or employees to add scanned/purchased items into the bags.

The cashbox 114 is a structure that generally include side walls, a back wall, a top wall, and an open front face. An interior area of the cash box 114 may include a cavity space having one or more shelves for supporting components of the POS station and/or storing objects. When the POS station is in its assembled state (i.e. such that is configured to perform transactions), the cashbox generally supports one or more electronic terminal components, such as, for example, the POS controller, the keyboard 116, the cash drawer 118, the display 120, the scan gun 122, and the receipt printer 124. When the POS station is in its disassembled state, the interior of the cashbox can generally store one or more electronic terminal components, such as, for example, the POS controller, the card reader 106, the optical scanner 108, the scale 110, customer display 130, the keyboard 116, the cash drawer 118, the display 120, the scan gun 122, and the receipt printer 124. The cash box 114 can include a notch along it exterior (shown in FIGS. 4 and 8) to accommodate the network and electricity pole 126 extending generally vertically up from the sales floor or down from the ceiling. The security camera 128 can be operatively coupled to the pole 126. Power and network connectivity can be provided to the components of the POS station via the pole 126.

The keyboard 116 can be operatively coupled to the POS controller and may be a multi-touch input system for customer to enter information onto the display 120. The keyboard provides functionality of I/O services receiving input from user input. In exemplary embodiments, when the POS station is in its assembled form, the keyboard 116 can be support on top of the cashbox 114. In some embodiments, the keyboard 116 can include an integrated card reader that allows a cashier to swipe a customer's card. In some embodiments, the keyboard 116 can include one or more microcontrollers (e.g., when it includes a card reader) and can execute firmware to implement one or more functions carried out by the keyboard 116. The firmware can be updated from time-to-time to update an operation of the optical scanner 108.

The cash drawer 118 may be a storage system for holding monetary funds customers use to pay for their transactions. The cash drawer can include an electromechanical lock and/or an electromagnetic lock to selectively lock and unlock the cash drawing in response to, for example, control signals received from the POS controller. For example, when a customer pays for a transaction with cash, the cashier can input the tender type and amount into the keyboard and the POS controller can process the input to transmit the control signal to the lock of the cash draw to allow the cash drawer to open and allow the cashier to place the money in the cash drawer and retrieve any change owed to the customer. In some embodiments, the cash drawer can be disposed in an interior area of the cashbox.

The display 120 and customer display 130 may be a computer monitor operatively coupled to the POS controller, and may display one or more graphical user interfaces generated by the POS controller. The graphical user interfaces can be rendered on the display to display information regarding items intended to be purchased along with information regarding completing the transaction and any other suitable information. In exemplary embodiments, when the POS station is in its assembled form, the display 120 and customer display 130 may be disposed on top of the cashbox 114.

The scan gun 122 may be a handheld optical scanning machine configured to read optical readable representations labeled on the products intended to be purchased. The scan gun 122 may be semi-portable where users can hold the scan gun and scan optical readable representations labeled on products without placing the products on the POS station. The scan gun 122 can be configured to scan encoded information from machine-readable representations. The optical scanner 108 may decode the encoded information and transmit the decoded information to the POS controller, or may in the alternative, transmit the encoded information to the POS controller, which may decode the encoded information. The scan gun 122 can be used to input item and/or loyalty/reward information into the POS terminal for use when processing a transaction for the customer. For example, the scan gun 122 can be configured to scan barcodes or QR codes associated with items to be purchased by a customer and/or can scan customer loyalty/rewards cards/tags. In example embodiments, the scan gun 122 can include one or more microcontrollers and can execute scan gun firmware to implement one or more functions carried out by the scan gun 122. The scan gun firmware can be updated from time-to-time to update an operation of the scan gun 122.

The receipt printer 124 may be a printer configured to print receipts for completed customer transactions. When the POS station is in its assembled form, the receipt printer can be supported by the cash box 114 and can be operatively coupled to the POS controller. The POS controller can send information and instructions to the receipt printer 124 to instruct the receipt printer to print receipts for transactions. In example embodiments, the receipt printer can include one or more microcontrollers and can execute printer firmware to implement one or more functions carried out by the receipt printer 124. The printer firmware can be updated from time-to-time to update an operation of the receipt printer 124.

The network and electricity pole 126 can extend generally vertically from the sales floor and/or from the ceiling and can form a conduit through which power and network cables can be routed to the POS station to provide electricity and network connectivity to one or more of the terminal components. The network and electricity pole 126 positioned adjacent to the cash box 114 and the power and network cables may be routed from the pole 126 to and through the cash box 114. For example, in exemplary embodiments, the cash box 114 can include a vertically extending notch configured to receive or accommodate the pole 126. One or more of the terminal components of the POS station can be configured to receive software updates via the network cable and/or may be configured to transmit their status to a remote server in communication with the terminal components over communication network via the network cable.

The security camera 128 may be a video camera configured recording video of the POS station and/or areas around the POS station. The security camera 128 may be coupled to the network and electricity pole 126. The security camera 128 can receive electricity from the power cable routed through the conduit of the pole 126 and can transmit video captured by the camera 128 via the network cable routed through the conduit of the pole 126

In an exemplary operation of the POS station in the assembled state or form, a customer can process and complete their transaction for merchandise intended for purchase using the POS station 100. Items for purchase can be placed on one of the belts 102 and can be transported towards the optical scanner. The POS station 100 can optically read the barcode on the merchandise using the optical scanner 108 or the scan gun 122. The POS station 100 can display the price of the merchandise identified by optically reading the barcode on the customer display 130. The POS station 100 can complete the transaction by accepting customer payment using the card reader 106 and printing a receipt of the transaction for the customer using the receipt printer 124. After an item is scanned, the item is place on another one of the belts to transport the item to the bagging station 112.

In exemplary embodiments, in the disassembled state or form, the non-electronic components of the terminal can be removed from the POS station and the sales floor, leaving the cash box 114 secured to the sales floor and the pole 126 in place. The POS controller, the card reader 106, the optical scanner 108, the scale 110, customer display 130, the keyboard 116, the cash drawer 118, the display 120, the scan gun 122, and the receipt printer 124 can be placed in the interior of the cash box 114 for storage, while maintaining power and network connectivity provided via the pole. A shroud can be placed over an open front face of the cash box 114 and can be secured to the cash box to prevent access to the interior of the cash box 114. While being stored in the cash box 114, the POS controller, the card reader 106, the optical scanner 108, the scale 110, customer display 130, the keyboard 116, the cash drawer 118, the display 120, the scan gun 122, and the receipt printer 124 can remain powered-on via the power cable routed through the pole 126 and can be connected to a communication network via the network cable routed through the pole 126. The POS controller, the card reader 106, the optical scanner 108, the scale 110, customer display 130, the keyboard 116, the cash drawer 118, the display 120, the scan gun 122, and/or the receipt printer 124 can receive software updates and/or modification in their stored state such that when the POS station is reassembled, the POS controller, the card reader 106, the optical scanner 108, the scale 110, customer display 130, the keyboard 116, the cash drawer 118, the display 120, the scan gun 122, and/or the receipt printer 124 can have current or up-to-date software.

Figure 3:
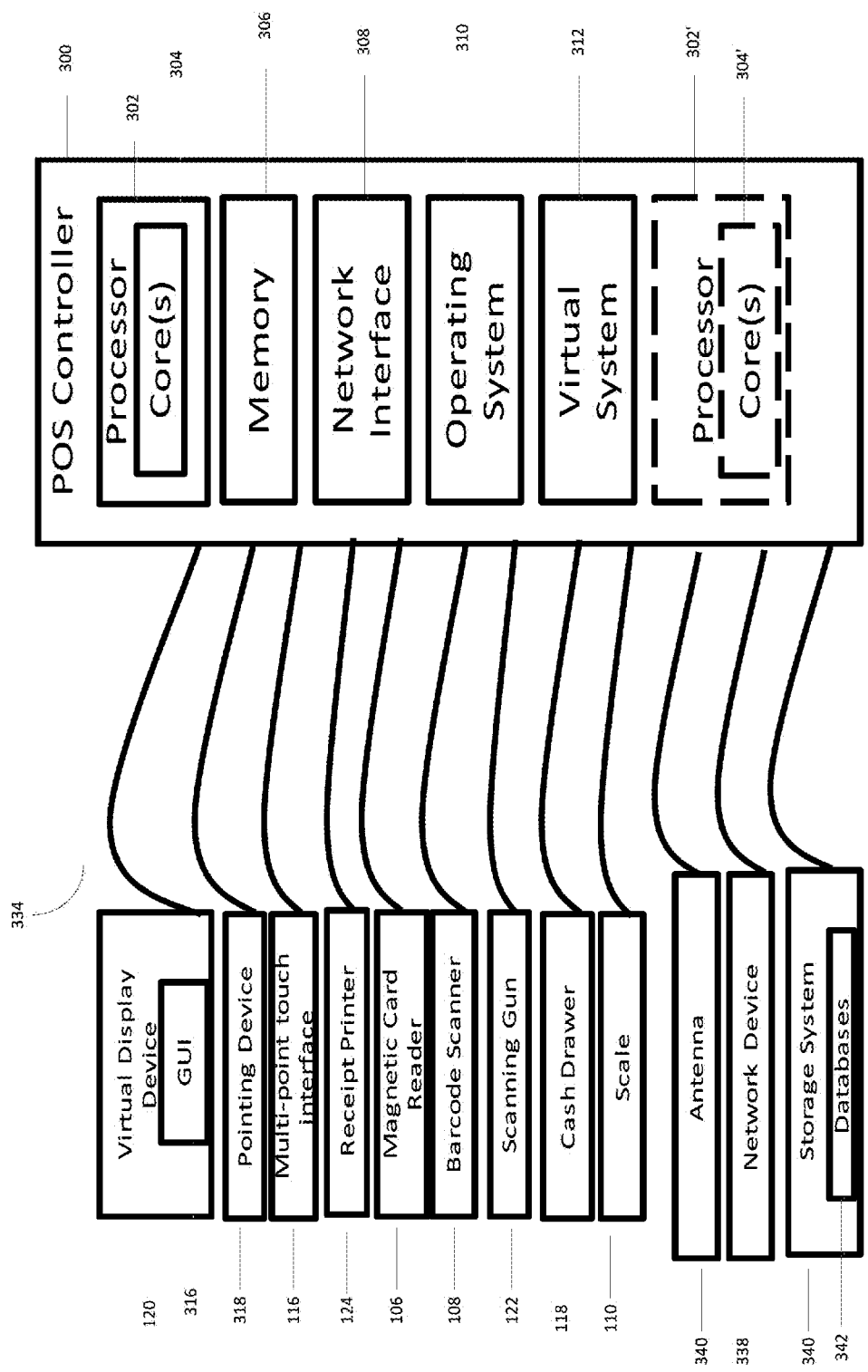
FIG. 3 is a block diagram of an example point-of-sale terminal of a point-of-sale station in accordance with example embodiments of the present disclosure.

FIG. 3 is a block diagram of a point-of-sale terminal 334 including an example POS controller 300 that may be used to implement exemplary operations of the point-of-sale terminal at a POS station in accordance with the present disclosure. The POS controller 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the POS controller 300 may store computer-readable and computer-executable instructions or software for implementing exemplary operations of the point-of-sale terminal. The POS controller 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for controlling terminal components operatively coupled to the POS controller 300. Processor 302 and processor(s) 302' may each be a single core processor or multiple core (304 and 304') processor.

Virtualization may be employed in the POS controller 300 so that infrastructure and resources in the POS controller may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user (e.g., a cashier) may interact with the POS controller 300 through components of the point-of sale terminal 334 that are operatively coupled to the POS controller 300 including, a visual display device 120, such as a computer monitor, which may display one or more graphical user interfaces 316. The POS controller 300 may include other I/O devices for receiving input from a user, for example, the card reader 106, the optical scanner 108, the scale 110, customer display 130, the keyboard 116, the cash drawer 118, the scan gun 122, and/or the receipt printer 124, as described herein. The POS controller 300 may include other suitable I/O peripherals.

The POS controller 300 may also include one or more storage devices 340, such as a hard-drive, CD-ROM, or other computer readable media, for storing data and computer-readable instructions and/or software that implement exemplary of the point-of-sale terminal. Exemplary storage device 340 may also store one or more databases for storing any suitable information required to implement exemplary embodiments. For example, exemplary storage device 340 can store one or more databases 342 for storing information such as transaction information, cashier information, product information, and/or any other suitable information. The databases may be updated manually or automatically at any suitable time to add, delete, and/or update one or more data items in the databases.

The POS controller 300 can include a network interface 308 configured to interface via one or more network devices 338 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 340 to facilitate wireless communication (e.g., via the network interface) between the POS controller 300 and a network. The network interface 308 may include a built-in network adapter, network interface card, PCMCIA network card, card bus network adapter, wireless network adapter, USB network adapter, modem or any other device suitable for interfacing the POS controller 300 to any type of network capable of communication and performing the operations described herein. In exemplary embodiments, the POS controller can be operatively coupled to a communication network via a network cable routed through the pole 126 (FIG. 1).

The POS controller 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the POS controller and performing the operations described herein. In exemplary embodiments, the operating system 310 may be run in native mode or emulated mode. In an exemplary embodiment, the operating system 310 may be run on one or more cloud machine instances.

Figure 4:
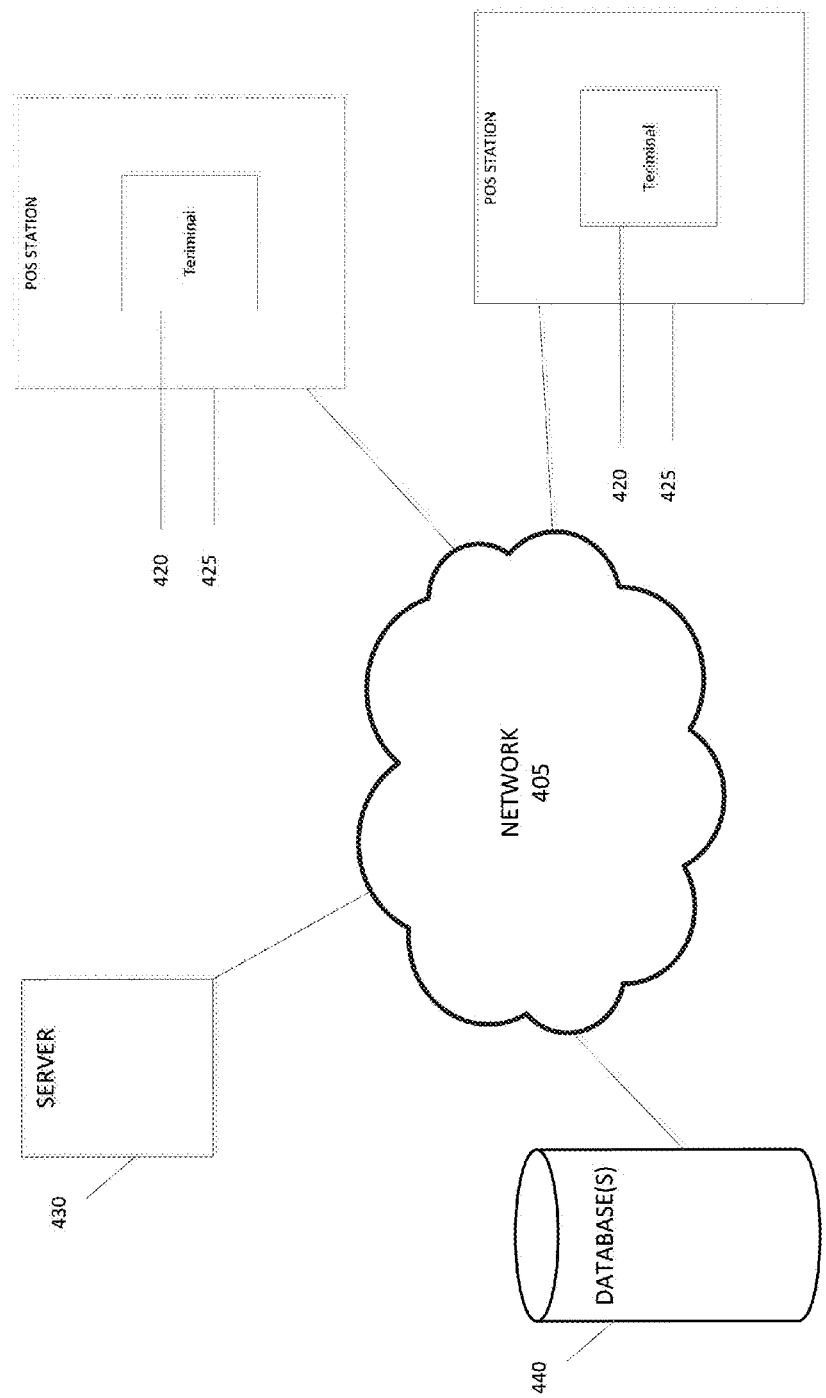
FIG. 4 illustrates an exemplary environment through which electronic point-of-sale terminal components communicate with other devices.

FIG. 4 illustrates a network diagram depicting a POS system 400. The system 400 can include a network 405, POS terminals 420 at POS stations 425, a server 430, and database(s) 440. Each of the POS terminals 420, server 430, and databases 440 is in communication with the network 405.

In an example embodiment, one or more portions of network 405 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The POS terminal 420 may connect to network 405 via a wired or wireless connection. The POS terminal 420 may include one or more applications or systems such as, but not limited to, a sales transaction application, a cashier performance application, a customer review application, a user interface application, a checkout lane parameter system, and the like. In an example embodiment, the POS terminal 420 may perform all the functionalities described herein.

Each of the server 430 and database(s) 440 is connected to the network 405 via a wired connection. Alternatively, one or more of the server 430 and databases 440, may be connected to the network 405 via a wireless connection. Server 430 includes one or more computers or processors configured to communicate with POS terminal 420 and database(s) 1030, via network 405. Server 430 hosts one or more applications configured to interact with one or more components of the POS terminal 420 and/or facilitates access to the content of database(s) 440. Database(s) 440 comprise one or more storage devices for storing data and/or instructions (or code) for use by server 430 and POS terminal 420. Database(s) 440 and server 430 may be located at one or more geographically distributed locations from each other or from POS terminal 420. Alternatively, database(s) 440 may be included within server 430.

In exemplary embodiments software updates can be provided to the electronic components of the POS terminal 420, via the network 405 and through a network cable routed through the pole 126 (FIG. 1) that is operatively coupled to the network 405. The software updates can be provided in the form of software update files such as batch files transferred from the server 430 through the network 405 to the electronic components of the POS terminals 420. The batch files can update a single or multiple electronic components of the POS terminals 420. In exemplary embodiments, a load file, an executable, swap file and command file can be used to update the software of the electronic components of the POS terminals 420. In some instances, one or more of the POS station 425 can be in the assembled state when it receives software updates and/or one or more of the POS stations 425 can be in the disassembled state when it receives software updates. In exemplary embodiments, regardless of the state of the POS station the electronic components of the POS terminals 420 can be updated in accordance with embodiments of the present disclosure.

Figure 5:
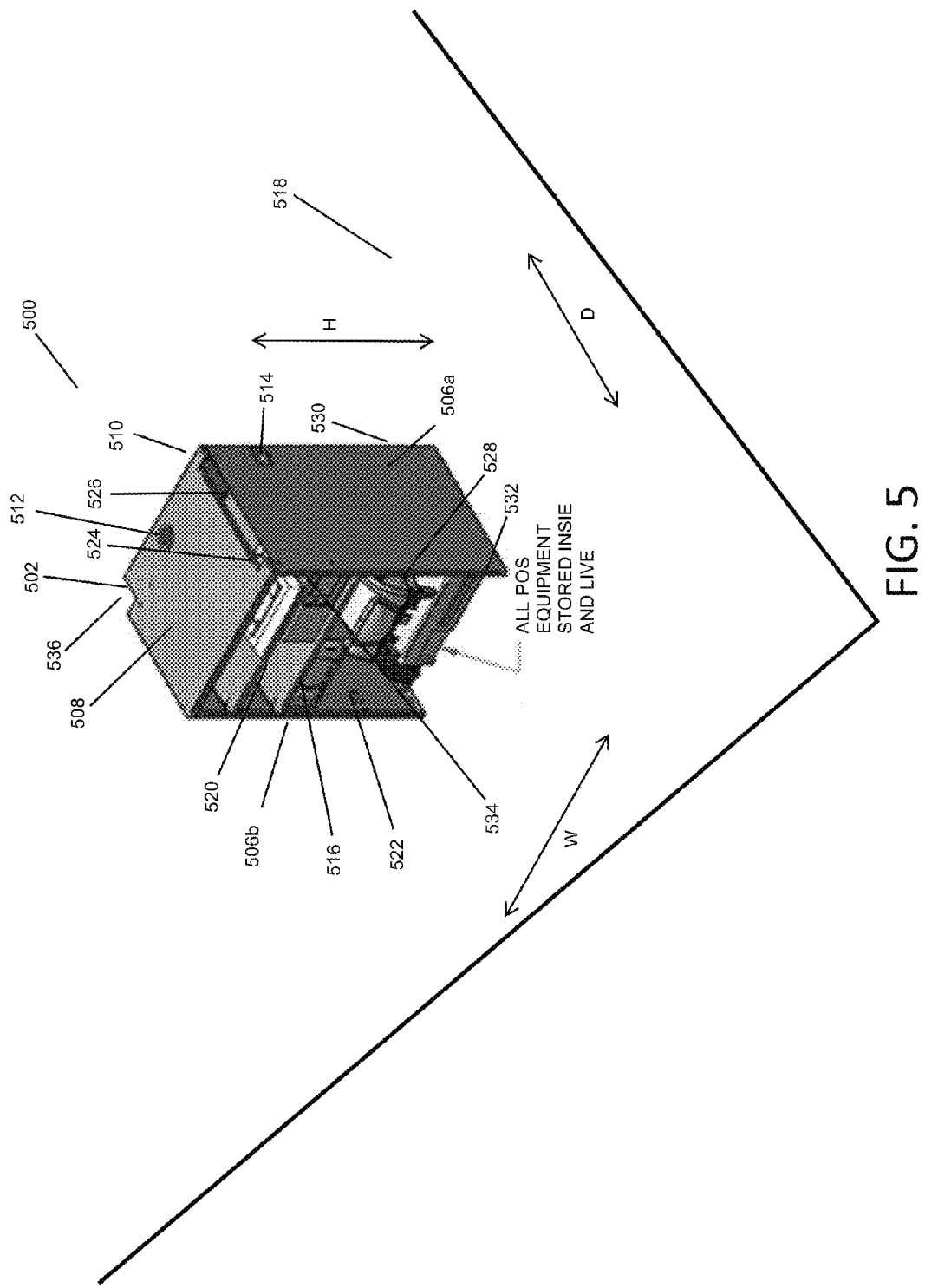
FIG. 5 illustrates a perspective front view of a cash box storing electronic components of a point-of-sale terminal according to an example embodiment.

FIG. 5 illustrates a front perspective view of a cash box 500 of a POS station according to an example embodiment. The cash box can have opposing side walls 506*a-b*, a top wall 508, a back wall 510, and an open face 520. The side walls 506*a-b*, the top wall 508, and back wall 510 can be operable coupled to each other to define an interior cavity 522 that is generally accessible via the open face 520. The side walls 506*a-b* and back wall 510 may extend downwardly from the top wall to the sales floor 518 such that a bottom end of the side walls 506*a-b* and the back wall 510 are in contact with and supported by the sales floor 518 and the side walls 506*a-b* and the back wall 508 support the top wall 508. The side walls 506*a-b* and back wall 510 can be generally rectangular, planar members that extend generally perpendicularly from the sales floor 518 and the top wall 508 can be a generally rectangular, planar member that extends generally parallel to the sales floor 518. In some embodiments, the top wall 508 can include a notch 502 formed in one of the corners of the top wall 508 as well as a notch 526 extending along an edge 524 of the top wall 508. The notch 526 formed along the edge of the top wall can provide an opening to the interior cavity 522 of the cash box 500. In some embodiments, the top wall 408 can include an opening or aperture that provides an opening to the interior cavity 522. These openings can be used to route cables between the interior cavity 522 and the exterior of the cash box 500.

In some embodiments, one or more of the side walls 506*a-b* and/or the back wall 510 can be secured to the sales floor to prevent the cash box 500 from being moved. As shown in FIG. 5, the cash box 500 can be devoid of a bottom wall and the sales floor 518 can operate as a bottom wall of the cash box 500. While the example embodiment of the cash box 500 shown in FIG. 5 is devoid of a bottom wall, exemplary embodiments of the cash box can include a bottom wall that is independent and distinct of the salesfloor.

The cash box can have a volume defined by a width W, a depth D, and a height H. The width W can be defined by a distance between the opposing side walls 506a-b. The depth D can be defined by a distance from a front edge 528 of the side wall 506a to the back edge 530 of the side wall 506a or from the front edge 528 of the side wall 506a to the back wall 510. The height H of the cash box 500 can be defined by a distance between a bottom edge 532 of the side wall 506a and a top edge 534 of the side wall 506a or from the bottom edge 532 of the side wall 506a to the top wall 408.

In exemplary embodiments, the cash box 500 can include a notch 536 extending along the entire height of the cash box 500 and having width and depth dimensions that correspond to width and depth dimensions of the notch 502 formed in the top wall 508. To form the notch 536 the depth of the side wall 506b can be less than the depth of the side wall 506a (e.g., by an amount substantially equal to the depth of the notch 536, and a width of the back wall 510 can be less than the width of the cash box 500 (as measured between the opposing side walls 506a-b) (e.g., by an amount that is substantially equal the width of the notch 536). The notch 536 of the cash box 500 can be dimensioned to receive or accommodate the pole 126 (FIG. 1) of a POS station.

In exemplary embodiments, the interior cavity 522 of the cash box 500 can include one or more shelves 516 (or drawers). The interior cavity 522 and the one or more shelves 516 disposed therein can be used to support terminal components when a POS station incorporating the cash box 500 is in an assembled state of form as well as when the POS station in a disassembled form. For example, when the POS station is in an assembled state, the interior of the cash box can house the POS controller and the keyboard, and when the POS station is in the disassembled state the cash box can store a card reader, barcode scanner, electronic scale, keyboard, cash drawer, displays, scan gun, receipt printer, as well as other suitable terminal components. Additionally, when the POS station is in an assembled state form the top wall 508 of the cash box can be used to support terminal components of the POS station, such as the cash drawer, display, receipt printer, and the scan gun. Furthermore, the top wall 508 of the cash box 500 may include a round opening for passing electric and network wires through to connect to the terminal components 334. The terminal components can be supported or stored within the cash box may stay connected to the network and electricity by power and network cables routed into the cash box 500 from the network and electricity pole 126.

Figure 6:
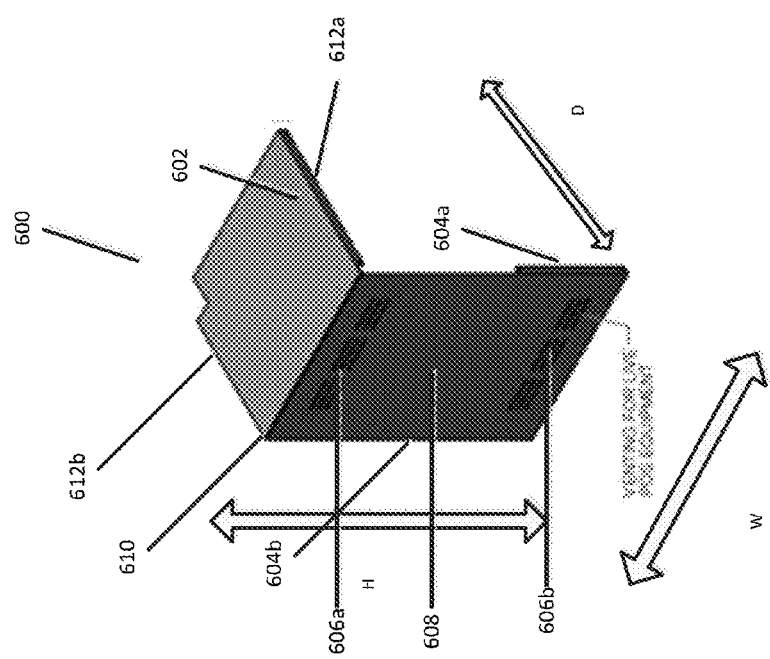
FIG. 6 illustrates a perspective front view of a shroud configured to cover an open face of a cash box according to an example embodiment.

FIG. 6 illustrates a perspective front view of a shroud 600 according to an example embodiment of the present disclosure. The shroud 600 may be formed by two planar portions 602 and 608 operatively coupled via a joint, such as a hinge 610. The (top) portion 602 and (front) portion 608 are rotatable with respect to each other about the hinge 610. The front portion 608 may include vents 606a and 606b. The vents 606a and 606b may be placed proximate to opposite edged of the front portion 608. In some embodiments, the vents 606a and 606b may be in sets of three extending across the width of the front portion 608.

The front portion 608 may include flaps 604a and 604b protruding generally perpendicularly from the side edges of the front portion 608 adjacent to an edge of the front portion 608 hingedly attached to the portion 602 and extend along at least a portion of the length of each side edge of the portion 608 that is adjacent to the edge is hingedly attached to the portion 602. That is, the flaps 604a and 604b can extend along the side edge between an edge of the front portion 608 that is disposed opposite the edge of the portion 608 that connected to the portion 602 of the shroud 600 towards the hinge 610. For example, the flaps 604a and 604b (not shown) can extend a quarter of the length of the side edge.

The top portion 602 may include flaps 612a and 612b protruding perpendicularly from the side edges of the top portion 602 that are adjacent to an edge of the top portion 602 that is hingedly attached to the portion 608 and extend along at least a portion of the length of each side edge of the portion 602 that is adjacent to the edge is hingedly attached to the portion 602. That is, the flaps 612a and 612b can extend along each side edge between an edge of the portion 602 that is disposed opposite the edge of the portion 602 that connected to the portion 608 towards the hinge 610. The flaps 612a and 612b may extend from one corner to nearly the opposite corner where the top portion 602 is connected to the front portion 608 (e.g., substantially the entire length of the side edge). The flap 612a can extend a portion of the length (e.g., approximately three quarter of the length) of the front portion 608 (defined as the distance between the edge of the portion 602 hingedly attached to the portion 608 to the edge of the portion 608 disposed opposite and away from the hinge 610) due to an indentation 614 formed in a perimeter of the top portion at a corner of the top portion 602, which can correspond to the notch 502 formed in the top wall of the cash box.

Figure 7:
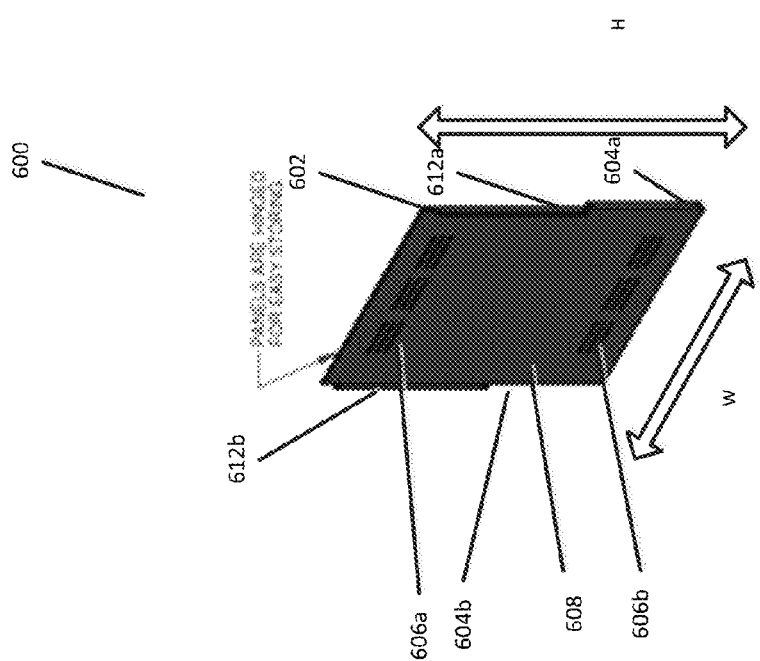
FIG. 7 illustrates a perspective front view of a shroud with a top face folded down according to an example embodiment.

FIG. 7 illustrates the front view of the shroud 600 with the portions 602 and 608 folded in a stored position according to an example embodiment. For example, in some embodiments, when the shroud 500 is not in-use, the portions 602 and 608 can be rotated with respect to each other so that the portions 602 and 608 are generally parallel to each other in a side-by-side (e.g., an opposing and overlapping) arrangement for storage purposes. To rotate the portions 602 and 608 of the shroud 600 towards each other, the portion 602 may rotated about the hinge 610. In the stored portion, the flaps 612a and 612b of the portion 602 can extend towards and/or beyond the portion 608 and the flaps 604a and 604b can extend towards and/or beyond the portion 608. Because the flaps 604a and 604b extend along a portion of the length of their respective side edges, the flaps 604a is disposed adjacent to the flap 612a without overlapping the flap 612a and the flap 604b is disposed adjacent to the flap 612b without overlapping the flap 612b. The flaps 604a and 612a can be dimensioned such that when the shroud is in the stored position, the flaps 604a and 612a extend substantially the entire length of the portion 608 (defined by the distance between the edge of the portion 608 hingedly coupled to the portion 602 and the edge of the portion 608 that is opposite and disposed away from the hinge 610.

Figure 8:
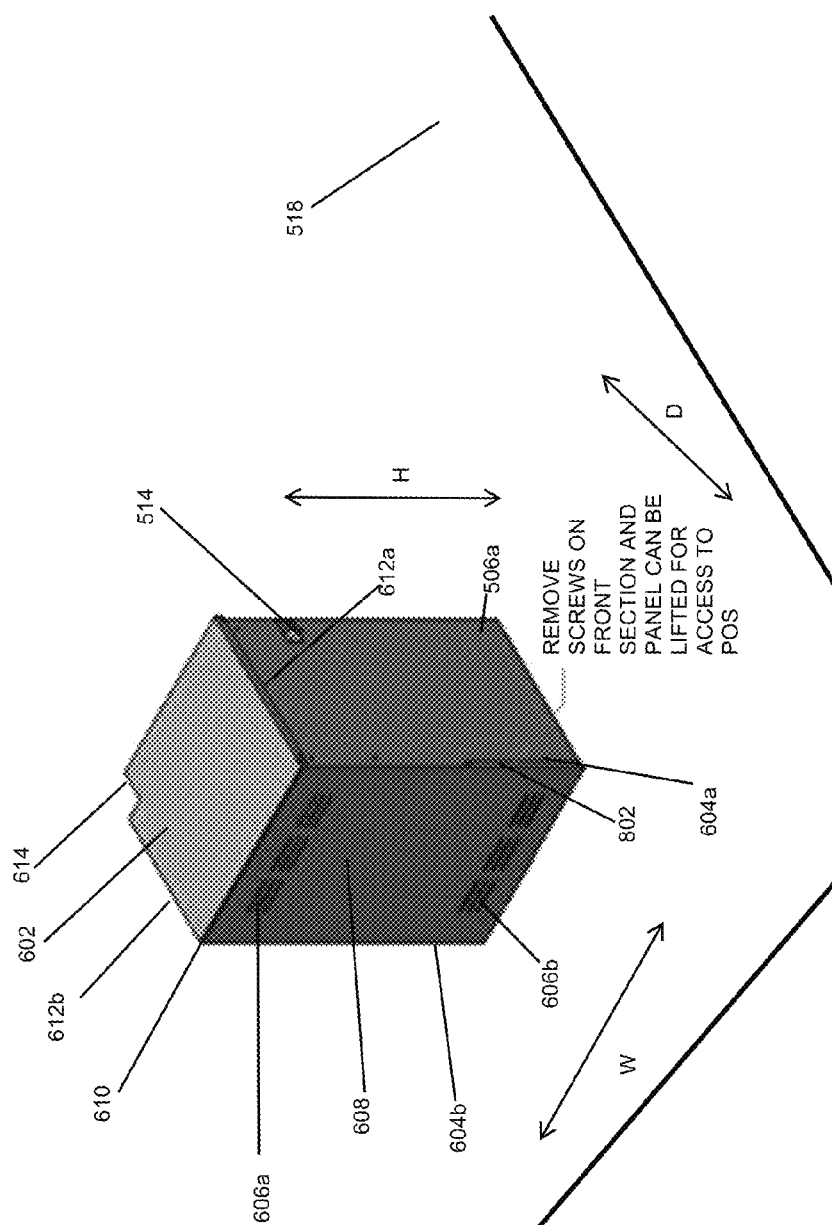
FIG. 8 illustrates a perspective front view of a shroud covering an open face of a cash box according to an example embodiment.

FIG. 8 illustrates a front view of a shroud secured to an embodiment of the cash box 500 on the sales floor 518. The front portion 608 of the shroud 600 covers the open face 520 of the cash box 500. The front portion of the shroud 602 has a perimeter as such that it is directly aligned with the open face of the cash box 520. Furthermore, the flaps 604 and 604' of the front portion 608 of the shroud may be affixed to the side walls 506a and 506b of the cash box 500. The top portion 602 may be secured to the top wall of the cash box. The top portion of the shroud may have a perimeter such that it is directly aligned with the top wall of the cash box 508. The notch 602 of the top portion 602 may be aligned to the notch 502 in the top wall 508 as such to accommodate the pole. The flap 612 on the top portion 502 may be aligned to fit in the opening on the top wall 508. The hinge 610 connecting the top portion 502 and front portion 508 may be aligned to the top of the open face 520 of the cash box 500 and one edge of the top wall 508 of the cash box. The flaps 604a and 604b of the portion 608 of the shroud 600 may be secured to the cash box by fastening member, such as screws 802 to affix the shroud 600 to the cash box 500, and the flaps 612a and 612b of the portion 602 may be secured to the cash box by fastening members, such as screws 702. The fastening members securing the portion 608 can be removed, while the fastening members that secure the portion 602 to the cash box can remain in place, to allow the front portion 608 to rotate about the hinge 610 while the top portion 602 remains secured to the top wall 508 of the cash box with a fixed orientation. This allows access to the interior cavity of the cash box without having to remove the shroud 600 from the cash box 500. For example, this can allow access to the terminal components stored in the cash box state for maintenance or other purposes when the POS station is in its disassembled.

Figure 9:
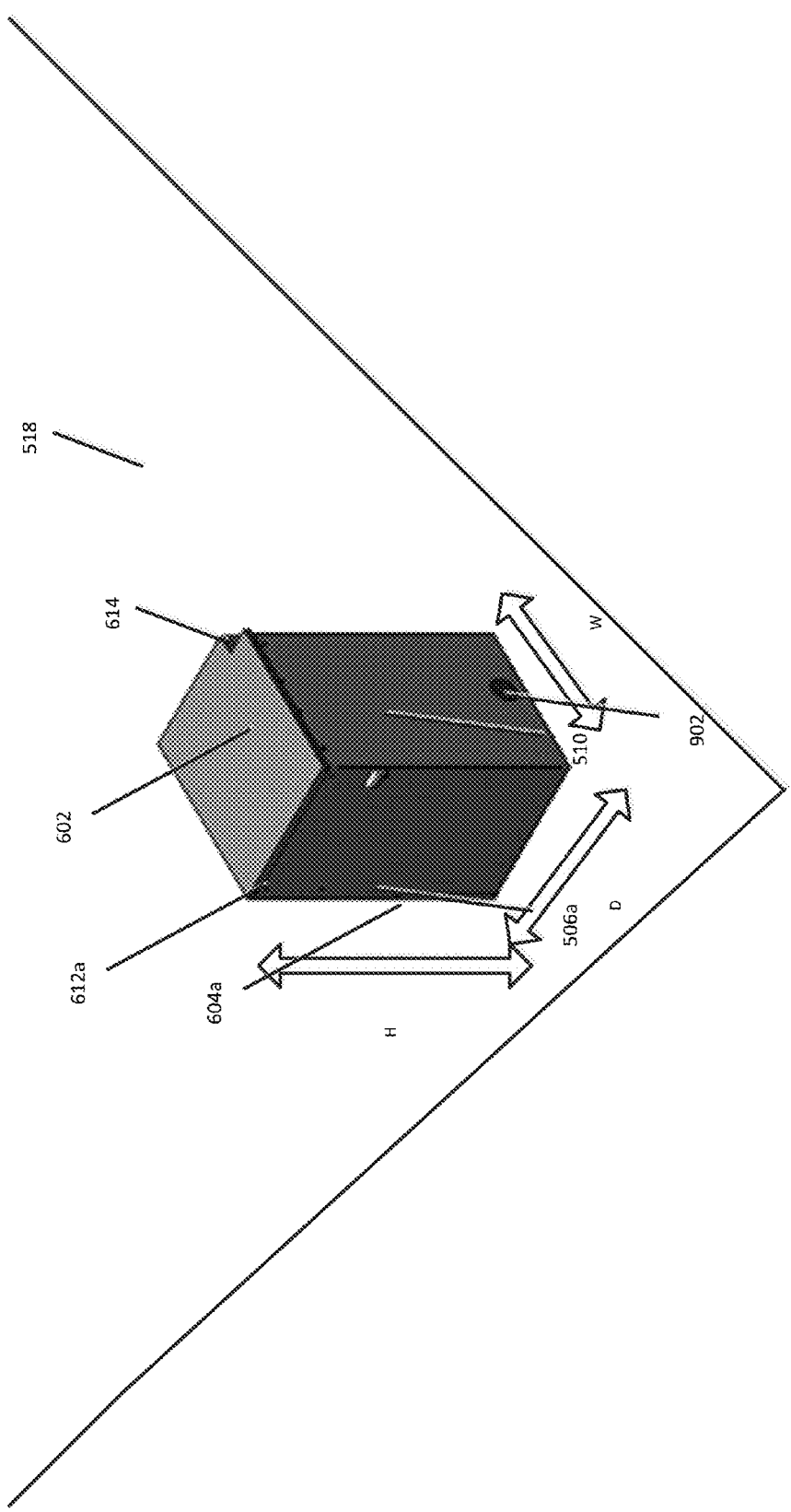
FIG. 9 illustrates a perspective side view of a shroud covering a cashbox according to an example embodiment.

FIG. 9 illustrates a side view of a shroud 600 secured to an open faced cash box 500 on the sales floor 518. The shroud 600 may cover the open face of the cash box 500. The locking member 514 may be still accessible on the side wall 506a of the cash box 500, after the shroud 600 is secured to the cash box 500. The shroud 600 may contain an opening 902 on the bottom of the cash box back wall 510 for insertion of electrical wires and network cables extending from the pole 126.

Figure 10:
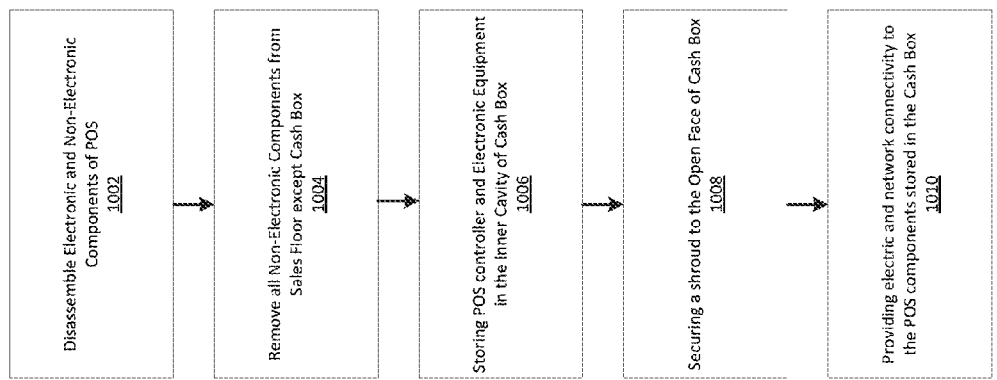
FIG. 10 is a flow chart showing an example method for disassembling the point-of-sale station and storing the components.

FIG. 10 is a flow chart showing the example method for disassembling the point-of-sale station and storing the components. In an example embodiment, in operation 1002, the POS station is disassembled and all the non-electronic and terminal components of the POS station are decoupled from each other and removed from their positions, with the exception of the cash box which can remain the same position in both the assembled and disassembled states. The non-electronic components may include but are not limited to: a belt 102, belt cabinet 104, and bagging station 112. The terminal components include but are not limited to the card reader 106, the optical scanner 108, the scale 110, customer display 130, the keyboard 116, the cash drawer 118, the display 120, the scan gun 122, and the receipt printer 124 (FIGS. 1 and 3). The network and electricity conductivity pole 126 may remain coupled to the cash box 114. The security camera 128 may stay coupled to the network and electricity pole 126.

In operation 1004 all of the non-electronic except for the cash box 114 are removed from the sales floor. The non-electronic components, such as a belt 102, belt cabinet 104 and bagging station are cleared from the sales floor and stored in storage. The removal of these non-electronic components creates space on the sales floor. The cash box 114 along with the network and electricity pole 126, and security camera 128 remain on the sales floor. The network and electricity pole 126 remains resting in the hollow opening of the cash box 114 and the security camera 128 remains coupled to the network and electricity pole 126.

In operation 1006, all of the terminal components are stored in the inner cavity of the cash box. The terminal components stored within the cash box may include but are not limited to, card reader 106, barcode scanner 108, scale 110, keyboard 116, cash drawer 118, display 120, scan gun 122, receipt printer 124, network and electricity conductivity pole 126, and security camera 128. The terminal components may be placed on the shelf like system inside the inner cavity of the cash box 114 according to the size and special necessities of the terminal component. All of the terminal components may be stored within the cash box in a decoupled manner.

In operation 1008, the shroud is secured to the open face of the cash box. In an example embodiment to secure the shroud to the cash box 114, the flap on of the top portion of the shroud may be affixed to the top wall of the cash box 114. Moreover, the shroud may have two screws at the bottom secured securing it to the cash box 114. The screws can be removed to allow access to the terminal components inside the cash box 114 by having the front portion to rotate about the hinge while the top portion remains secured to the top surface of the cash box with a fixed orientation. The front portion of the shroud may include vents to provide ventilation to the terminal components stored within the inner cavity of the cash box 114. The shroud may not cover the hollow opening of the cash box in which the network and electricity pole rests.

In operation 1010, the terminal components stored within the cash box remain connected to the network and electricity pole 126. The network and electricity pole 128 remains in place and provides a conduit through which power and network connectivity passes into the cash box 114. This provides the ability for the terminal components to stay updated with the latest software updates along with powered on to complete the software updates.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:
1. A point-of-sale (POS) assembly comprising:
  a POS controller;
  one or more peripheral electronic components in communication with the POS controller;
  a plurality of non-electronic components, the plurality of non-electronic components including a cashbox, the cashbox being secured to a sales floor of a store, the cash box having opposing side walls, a back wall, and a top wall defining an interior cavity accessible via an open front face of the cashbox; and an electrical conduit extending from the sales floor or a ceiling of the store to provide electricity and network connectivity to the POS controller and the one or more peripheral electronic components via the cashbox, wherein, in an assembled state, the plurality of non-electronic components are disposed on the sales floor and the one or more peripheral devices are disposed external to the interior cavity of the cashbox to form a checkout area to facilitate one or more financial transactions, and wherein, in a disassembled state, the cashbox remains on the sales floor while the remainder of the plurality of non-electronic components are removed from the sales floor and the POS controller and the one or more electronic components are stored in the interior cavity of the cashbox, the front open face of which being covered by a shroud secured to the cashbox to prevent removal of the POS controller and the one or more electronic components, the POS controller and the one or more peripheral electronic components stored in the cashbox receiving electricity and network connectivity via the electrical conduit to keep the POS controller and the one or more peripheral electronic components stored in the interior cavity of the cashbox connected to electricity and to a network.

2. The assembly of claim 1, wherein the shroud is formed by a first planar portion and a second planar portion, the first and second planar portions being rotatably coupled to one another at a joint, the first planar portion of the shroud being selectively secured to at least one of the opposing sidewalls or the top wall of the cash box, and the second planar portion of the shroud being selectively secured over the open front face of the cash box.

3. The assembly of claim 2, wherein the joint includes a hinge that rotatably couples the first and second planar portions of the shroud to each other.

4. The assembly of claim 2, wherein the second planar portion includes a first flange extending along a length of a first edge of the second planar portion adjacent to the joint and a second flange extending along a length of a second edge of the second planar portion adjacent to the joint, the first and second flanges extending over respective ones of the opposing side walls when the second planar portion covers the open front face, the first and second flanges include one or more areas at which the second planar portion is secured to the cashbox.

5. The assembly of claim 1, wherein the electronic components includes at least one of: an electronic scale, a barcode reader, a card reader, a scan gun, and a receipt printer.

6. The assembly of claim 1, wherein one or more vents are formed on the second portion of the shroud.

7. The assembly of claim 1, wherein the power conduct is a pole.

8. The assembly of claim 7, further comprising a security camera operatively coupled to the pole.

9. A method for storing electronic components of a point of sale (POS) assembly using a component of the POS assembly comprising:

disassembling a POS assembly, wherein a POS assembly comprises of a POS controller, one or more peripheral electronic components in communication with the POS controller, and a plurality of non-electronic components, the plurality of non-electronic components including a cashbox secured to a sales floor and having opposing side walls, a back wall, and a top wall defining an interior cavity accessible via an open front face of the cashbox;

removing, from the sales floor, at least some of the plurality of non-electronic components, the cash box remaining on and secured to the sales floor;

storing, in the interior cavity of the cash box, the POS controller and the one or more peripheral electronic components in communication with the POS controller;

securing a shroud to the open face of the cash box to prevent removal of the POS controller and the one or more electronic components from the cash box; and providing electricity and network connectivity, via an electrical conduit extending from the sales floor or a ceiling of the store, to the POS controller and the one or more peripheral electronic components stored in the interior cavity of the cashbox.

10. The method of claim 9, wherein the shroud is formed by a first planar portion and a second planar portion, the first and second planar portions being rotatably coupled to one another at a joint.

11. The method of claim 10, further comprising selectively securing the first planar portion of the shroud to at least one of the opposing sidewalls or the top wall of the cash box, and the second planar portion of the shroud over the open front face of the cash box.

12. The method of claim 9, wherein the one or more peripheral electronic components includes at least one of: an electronic scale, a barcode reader, a card reader, a scan gun, and a receipt printer.

13. A system for storing electronic components of a point of sale (POS) assembly using a component of the POS assembly, the system comprising:

a cashbox of the POS assembly secured to a sales floor of a store, the cash box having opposing side walls, a back wall, and a top wall defining an interior cavity accessible via an open front face of the cashbox;

an electrical conduit extending from the sales floor or a ceiling of the store through which electricity and network connectivity are provided to the interior cavity of the cashbox; and a shroud configured to be selectively secured to the cashbox to cover the front open face of the cashbox and obstruct access to the interior cavity of the cashbox, wherein electronic components of the POS assembly are stored within the interior cavity of the cashbox when the POS assembly is disassembled and the shroud is secured to the cash box to enclose the electronic components of the POS assembly within the interior cavity of the cashbox when the POS assembly is disassembled and prevent removal of the electronic components from the cash box, the electronic components enclosed in the cashbox receiving electricity and network connectivity via an electrical conduit extending from the sales floor or a ceiling of the store to keep the electronic components of the POS assembly enclosed in the interior cavity of the cashbox connected to electricity and to a network.

14. The system of claim 13, wherein the shroud is formed by a first planar portion and a second planar portion, the first and second planar portions being rotatably coupled to one another at a joint, wherein the first planar portion of the shroud is selectively secured to at least one of the opposing sidewalls or the top wall of the cash box, and the second planar portion of the shroud is selectively secured over the open front face of the cash box.

15. The system of claim 14, wherein the first and second planar portions of the shroud are secured to each other using a hinge.

16. The system of claim 14, wherein the second planar portion includes a first flange extending along a length of a first edge of the second planar portion adjacent to the joint and a second flange extending along a length of a second edge of the second planar portion adjacent to the joint, the first and second flanges extending over respective ones of the opposing side walls when the second planar portion covers the open front face, the first and second flanges include one or more areas at which the second planar portion is secured to the cashbox.

17. The system of claim 13, wherein the electronic components includes at least one of: an electronic scale, a barcode reader, a card reader, a scan gun, and a receipt printer.

18. The system of claim 13, wherein one or more vents are formed on the second portion of the shroud.

19. The system of claim 13, wherein the power conduct is a pole.

20. The system of claim 19, further comprising a security camera operatively coupled to the pole.

\* \* \* \* \*